Patented Nov. 14, 1950

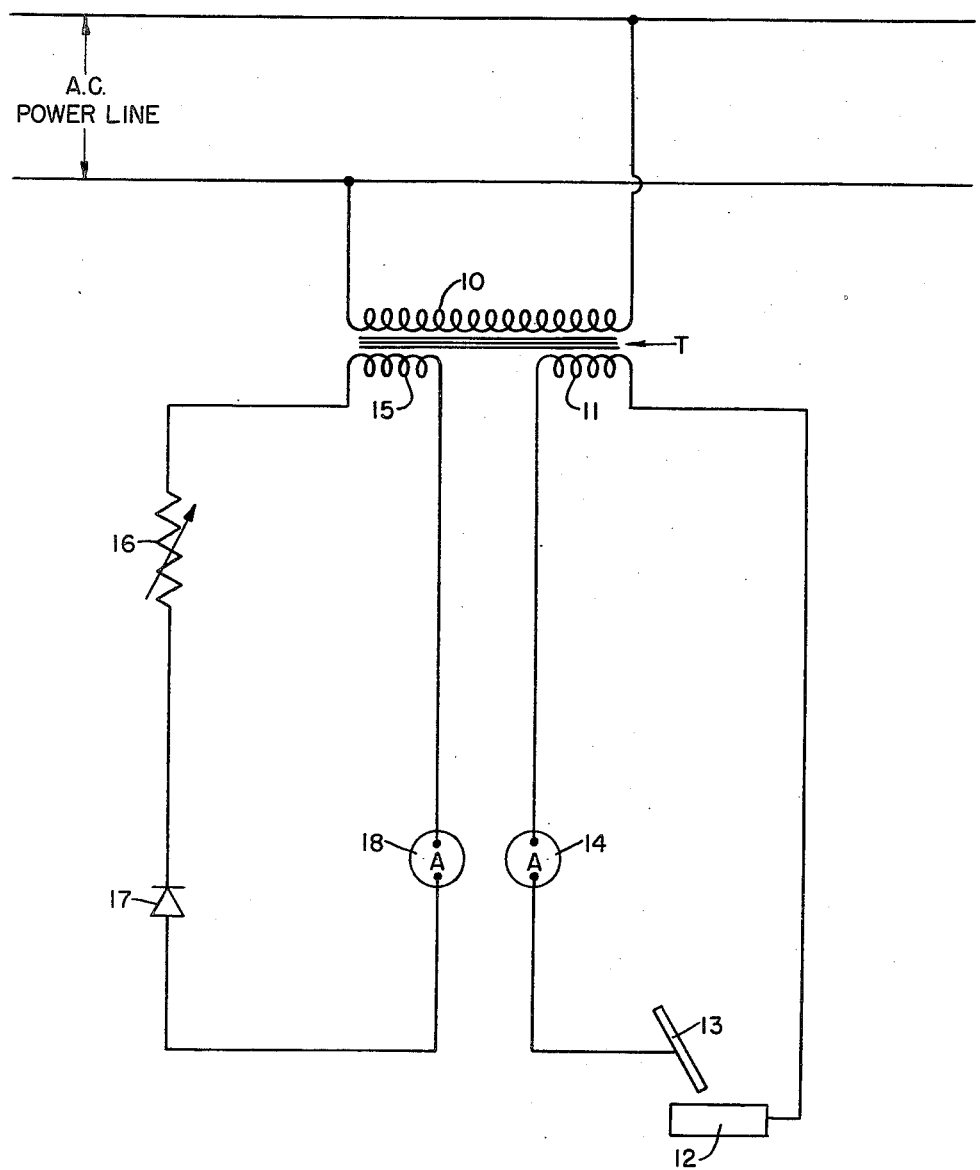

2,529,715

UNITED STATES PATENT OFFICE 2,529,715

ARC WELDING METHOD AND APPARATUS

Joseph M. Tyrner, New York, N. Y., and Nelson E. Anderson, Scotch Plains, N. J., assignors to Air Reduction Company, Incorporated, a corporation of New York Application September 30, 1948, Serial No. 51,924

4 Claims. (Cl. 315—276)

This invention relates to electric arc welding.

In A. C. arc welding generally, and more particularly in A. C. arc welding in which the electrode material differs from the work material, current is conducted through the arc more readily during one-half the current cycle than the other. This is caused by the difference in the amount of electrons emitted by each material. For example, in the inert gas shielded arc welding of aluminum the tungsten electrode usually employed emits electrons more readily than the aluminum. Therefore, more current flows on the electrode negative half of the current cycle than on the electrode positive half. This partial rectification in the arc results in a D. C. component of current which, in a transformer welding system, flows through the transformer secondary winding, thus creating a magnetomotive force which produces magnetic flux that tends to saturate the core of the transformer, thereby causing high input current to the primary winding of the transformer and greatly reducing the power factor of the system. This condition adds to the danger of transformer burnout and may cause overloading of primary supply lines and consequent fuse blowing. In addition it causes higher harmonics in the primary input current. These high frequency components may cause corresponding harmonic frequency voltage drops in the primary circuit and circulating currents in other electrical equipment connected to the same circuit.

One object of this invention is to provide an improved transformer A. C. arc welding method in which the transformer is unaffected by the above-described D. C. component of current caused by partial rectification in the arc.

This object is achieved by inducing an auxiliary alternating current from the primary winding of the transformer, rectifying it, and utilizing the resulting direct current to produce an additional magnetomotive force which opposes the magnetomotive force produced by the D. C. component of current in the welding circuit, and adjusting the value of the additional magnetomotive force until no magnetic flux is produced in the transformer core by either of the magnetomotive forces.

Another object of the invention is to provide improved welding apparatus by which the method can be carried out.

The accompanying drawing is a schematic representation of an A. C. welding system embodying apparatus features of the invention and which is adapted to carry out the improved method.

Referring to the drawing, the primary winding 10 of a welding transformer T is connected across an A. C. power line, usually a 60-cycle line. One side of a secondary winding 11 is connected to the workpiece 12 and the other side to an electrode 13. A D. C. ammeter 14 may be placed anywhere in the welding circuit.

An auxiliary secondary winding 15 is added to the transformer T. In series with and completing the circuit of this auxiliary winding are a variable resistor 16, a rectifier 17 and a D. C. ammeter 18.

When the primary winding 10 of the transformer is energized from the A. C. supply, alternating current flows in the welding circuit, and due to rectification in the arc, as explained above, a D. C. component of current also flows in this circuit, the value of which can be ascertained by reading the ammeter 14. This D. C. component creates a magnetomotive force that produces magnetic flux in the transformer core which is proportional in quantity to the product of the direct current and the number of turns on the secondary winding 11.

When the primary winding 10 is energized from the A. C. supply, current also flows in the circuit of the auxiliary secondary winding 15. Since the rectifier 17, which may be of the dry disc selenium type or any other suitable type, will pass current in only one direction, the current in the auxiliary winding circuit is direct current. This current also creates a magnetomotive force which tends to produce magnetic flux in the core of the transformer, the quantity of which is proportional to the product of the current and the number of turns on the auxiliary secondary winding 15. The direction of the auxiliary winding 15, its relation to the main secondary winding 11, and the polarity of the rectifier, are such that the magnetomotive force produced by the auxiliary winding opposes the magnetomotive force produced by the main secondary winding. By means of the variable resistor 16 the value of the current in the circuit of the auxiliary winding 15 can be regulated and hence the value of the magnetomotive force created by the auxiliary winding can be adjusted. The resistor 16 is adjusted until the magnetomotive force created by the auxiliary winding 15 is substantially equal to that created by the main secondary winding 11, and since the two magnetomotive forces are in opposition this prevents the D. C. component of current flowing through the main secondary winding 11 from producing any substantial amount of magnetic flux in the transformer core. This eliminates the detrimental effects of the D. C. component of current in the transformer and accomplishes the principal object of the invention. Of course, the resistor 16 should not be adjusted to a point where the magnetomotive force of the auxiliary winding 15 is greater than that of the main secondary winding 11 because then magnetic flux would be produced in the transformer core by the preponderance of the magnetomotive force of the auxiliary winding.

In practice, the resistor 16 is adjusted until the readings of the ammeters 14 and 18 are inversely proportional to the number of turns on the respective secondary windings. For example, if the auxiliary secondary winding 15 has half the number of turns on the secondary winding 11, the resistor 16 is adjusted so that the reading of ammeter 18 is twice as great as that of ammeter 14. If the two secondary windings have the same number of turns then, of course, the resistor 16 is adjusted so that the ammeter 18 reads the same as ammeter 14.

We claim:

1. In an A. C. arc welding system in which the work and the electrode are connected to the secondary winding of a welding transformer, the method of eliminating harmful effects in the transformer which would otherwise be caused by the flux produced in the transformer core by the magnetomotive force created by any D. C. component of current flowing through said secondary winding as a result of partial current rectification in the arc, which comprises inducing an auxiliary alternating current from the primary winding of the transformer, rectifying such auxiliary alternating current, utilizing the resulting direct current to produce an additional magnetomotive force which opposes said first-named magnetomotive force, and adjusting the value of said additional magnetomotive force until substantially no magnetic flux is produced in the transformer core by said first-named magnetomotive force.

2. In an A. C. arc welding system in which the work and the electrode are connected to the secondary winding of a welding transformer, the method of eliminating harmful effects in the transformer which would otherwise be caused by the flux produced in the transformer core by any D. C. component of current flowing through said secondary winding as a result of partial rectification in the arc, which comprises inducing an auxiliary alternating current from the primary winding of the transformer and rectifying the same to produce a direct current, and passing such direct current around the core of the transformer in a direction opposite to that in which said D. C. component of current passes around it, and adjusting the value of the direct current resulting from the rectification until substantially no magnetic flux is produced in the transformer core by said D. C. component of current.

3. Welding apparatus comprising a transformer having a core provided with a primary winding connectible to an alternating current source, the transformer core also having a main secondary winding connectible to a welding electrode and the work, means in the circuit of said main secondary winding for indicating the value of any D. C. component of current flowing in such circuit, an auxiliary secondary winding on the transformer core, means for passing a direct current through said auxiliary winding, means for indicating the value of said direct current, and manually operable means for adjusting the value of said direct current.

4. Welding apparatus comprising a transformer having a core provided with a primary winding connectible to an alternating current source, the transformer core also having a main secondary winding connectible to a welding electrode and the work, an ammeter in the circuit of said main secondary winding for indicating the value of any D. C. component of current flowing in such circuit, an auxiliary secondary winding on the transformer core, and a rectifier and an adjustable resistor and also an ammeter connected in a closed circuit with said auxiliary winding.

JOSEPH M. TYRNER.
NELSON E. ANDERSON.

REFERENCES CITED

The following references are of record in the file of this patent:

UNITED STATES PATENTS

| Number | Name | Date |
|---|---|---|
| 2,473,323 | Welch, Jr. | June 7, 1949 |

FOREIGN PATENTS

| Number | Country | Date |
|---|---|---|
| 419,289 | Great Britain | Nov. 1, 1934 |